(12) United States Patent
Zhang et al.

(10) Patent No.: US 11,288,266 B2
(45) Date of Patent: Mar. 29, 2022

(54) CANDIDATE PROJECTION ENUMERATION BASED QUERY RESPONSE GENERATION

(71) Applicant: MICRO FOCUS LLC, Santa Clara, CA (US)

(72) Inventors: Chi Zhang, Santa Clara, CA (US); Zhibo Peng, Santa Clara, CA (US); Yuanzhe Bei, Santa Clara, CA (US); Olga Papaemmanouil, Santa Clara, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 191 days.

(21) Appl. No.: 16/717,615

(22) Filed: Dec. 17, 2019

(65) Prior Publication Data

US 2021/0182293 A1 Jun. 17, 2021

(51) Int. Cl.
*G06F 16/00* (2019.01)
*G06F 16/2453* (2019.01)
*G06F 16/22* (2019.01)
*G06F 16/21* (2019.01)
*G06F 16/27* (2019.01)

(52) U.S. Cl.
CPC ...... *G06F 16/24537* (2019.01); *G06F 16/212* (2019.01); *G06F 16/221* (2019.01); *G06F 16/2282* (2019.01); *G06F 16/24544* (2019.01); *G06F 16/27* (2019.01)

(58) Field of Classification Search
CPC ............ G06F 16/24537; G06F 16/221; G06F 16/212; G06F 16/27; G06F 16/24544; G06F 16/2282
See application file for complete search history.

(56) References Cited

U.S. PATENT DOCUMENTS

| | | | |
|---|---|---|---|
| 8,290,931 B2 | 10/2012 | Hong et al. | |
| 8,312,027 B2* | 11/2012 | Lamb | G06F 16/24542 707/752 |
| 8,671,091 B2* | 3/2014 | Cherniack | G06F 16/24539 707/714 |
| 9,471,630 B2* | 10/2016 | Gupte | G06F 16/24534 |
| 10,007,686 B2 | 6/2018 | Lawande et al. | |

(Continued)

OTHER PUBLICATIONS

Ziani, et al., "Maxpart—An efficient search space pruning approach to vertical partitioning", Computing and Informatics, vol. 37, 2018, pp. 915-945.

(Continued)

*Primary Examiner* — Alexander Khong

(57) ABSTRACT

In some examples, candidate projection enumeration based query response generation may include obtaining a query, and identifying, based on the query, a plurality of candidate columns from at least one table to respond to the query. Using a tree-based model, the candidate columns may be analyzed to generate a candidate set of projections to respond to the query. Each candidate projection of the candidate set of projections may include a sort order associated with at least one candidate column of the candidate columns, a segmentation key value associated with at least one candidate column of the candidate columns, and a replication value associated with the candidate projection. Based on the candidate set of projections, a response to the query may be generated.

20 Claims, 11 Drawing Sheets

(56) References Cited

U.S. PATENT DOCUMENTS

| | | | |
|---|---|---|---|
| 10,650,017 B1* | 5/2020 | Gupta | G06F 16/2282 |
| 10,713,272 B1* | 7/2020 | Caldwell | G06F 16/283 |
| 2010/0235335 A1* | 9/2010 | Hernan | G06F 16/221 |
| | | | 707/703 |
| 2015/0379009 A1* | 12/2015 | Reddy | G06F 16/2343 |
| | | | 707/747 |
| 2017/0046394 A1* | 2/2017 | Skidanov | G06F 16/2379 |
| 2017/0075965 A1* | 3/2017 | Liu | G06F 16/27 |
| 2019/0065538 A1* | 2/2019 | Leuchtenburg | G06F 16/23 |

OTHER PUBLICATIONS

Lamb et al., "The Vertica Analytic Database-C store 7 years later", Aug. 31, 2012, Istanbul, Turkey. Proceedings of the VLDB Endowment, vol. 5, No. 12., pp. 1790-1801.

* cited by examiner

| A | B | C | D | A | B | C | D | R |
|---|---|---|---|---|---|---|---|---|
| 1 | 2 | NULL | NULL | NULL | NULL | NULL | 1 | 0 |

```
--Query 1
SELECT custkey, name, max(acctbal) as avg_acctbal
FROM customer
WHERE nationkey = 1
GROUP BY custkey, name
ORDER BY avg_acctbal desc;

--Query 2
SELECT custkey, name, max(totalprice) as max_price
FROM customer, orders
WHERE c_custkey = o_custkey AND o_orderdate > '1993-10-01'
GROUP BY custkey, name
ORDER BY max_price desc;
```

FIG. 4A

| TABLE CUSTOMER | | | |
|---|---|---|---|
| CUSTKEY | NAME | NATIONKEY | ZIPCODE |

| TABLE ORDERS | |
|---|---|
| CUSTKEY | ORDERDATE |

*FIG. 4B*

| TABLE CUSTOMER | | |
|---|---|---|
| CUSTKEY | NAME | NATIONKEY |

FIG. 4C

Final Sort Orders =<*Custkey, Name, Nationkey*>
Segmentation Keys = <*Custkey, Name*>

```
┌─────────────────────────────────────────────────────────────┐
│  IDENTIFY, BASED ON A QUERY, A PLURALITY OF CANDIDATE COLUMNS│
│         FROM AT LEAST ONE TABLE TO RESPOND TO THE QUERY      │
│                            602                               │
└─────────────────────────────────────────────────────────────┘
                              │
                              ▼
┌─────────────────────────────────────────────────────────────┐
│  ANALYZE, USING A TREE-BASED MODEL, THE CANDIDATE COLUMNS    │
│  TO GENERATE A CANDIDATE SET OF PROJECTIONS TO RESPOND TO    │
│                          THE QUERY                           │
│                            604                               │
└─────────────────────────────────────────────────────────────┘
                              │
                              ▼
┌─────────────────────────────────────────────────────────────┐
│  GENERATE, FOR EACH CANDIDATE PROJECTION OF THE CANDIDATE    │
│   SET OF PROJECTIONS, A STATE VECTOR THAT IS ANALYZED TO     │
│         CONTROL EXPANSION OF THE TREE-BASED MODEL            │
│                            606                               │
└─────────────────────────────────────────────────────────────┘
                              │
                              ▼
┌─────────────────────────────────────────────────────────────┐
│   GENERATE, BASED ON THE CANDIDATE SET OF PROJECTIONS, A     │
│                    RESPONSE TO THE QUERY                     │
│                            608                               │
└─────────────────────────────────────────────────────────────┘
```

*FIG. 6*

CANDIDATE PROJECTION ENUMERATION BASED QUERY RESPONSE GENERATION

BACKGROUND

A query may be related to contents that are stored on one or more nodes of a distributed database. For example, the contents may be stored in a table or another format on the nodes of the distributed database. The contents may be analyzed to generate a response to the query.

BRIEF DESCRIPTION OF DRAWINGS

Features of the present disclosure are illustrated by way of example and not limited in the following figure(s), in which like numerals indicate like elements, in which:

FIG. 2 illustrates a tree node state table to illustrate operation of the candidate projection enumeration based query response generation apparatus of FIG. 1 in accordance with an example of the present disclosure;

FIGS. 4A-4E illustrate an example of operation of the candidate projection enumeration based query response generation apparatus of FIG. 1 in accordance with an example of the present disclosure;

FIG. 6 illustrates a flowchart of an example method for candidate projection enumeration based query response generation in accordance with an example of the present disclosure.

DETAILED DESCRIPTION

Figure 1:
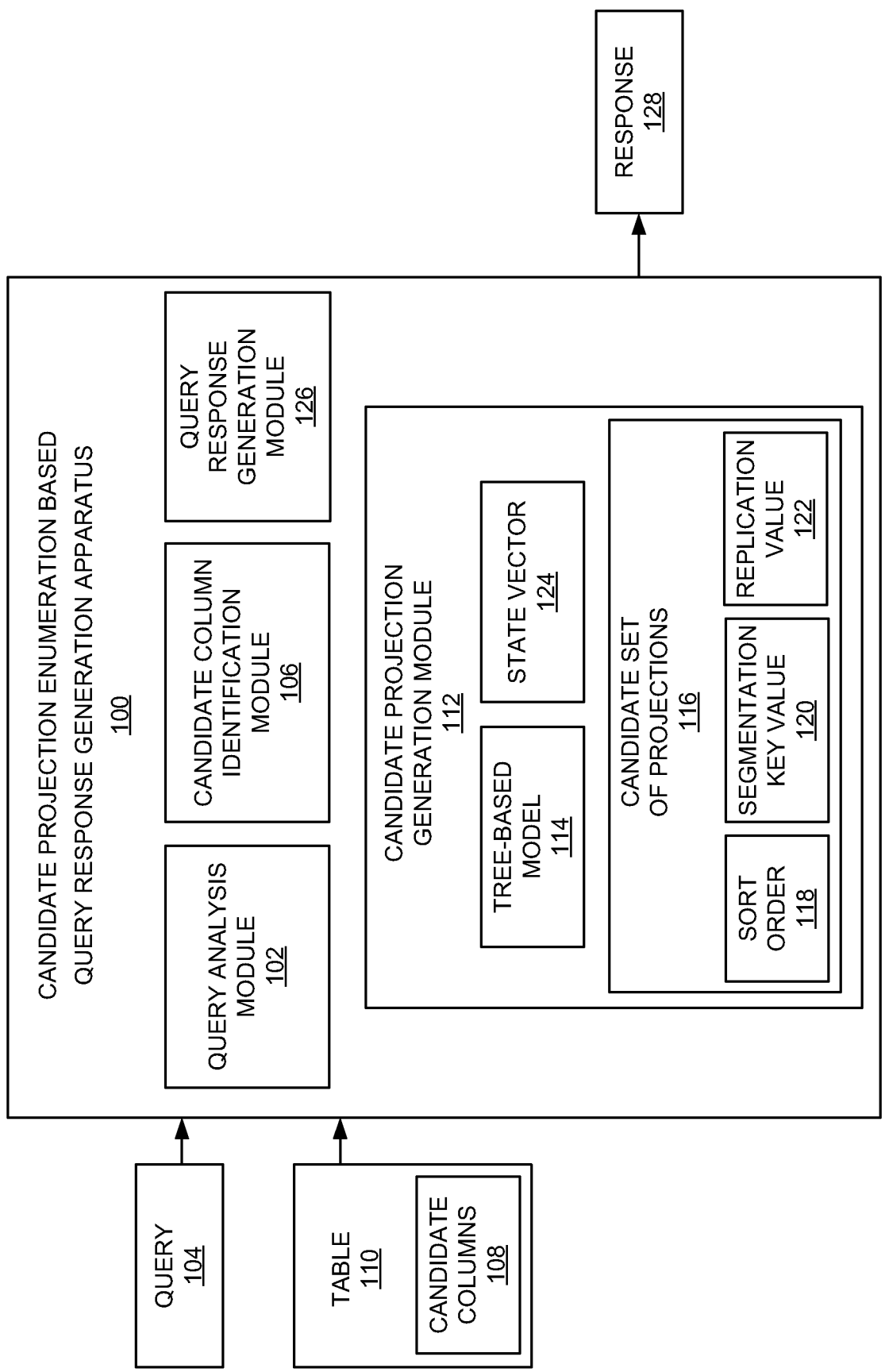
FIG. 1 illustrates a layout of a candidate projection enumeration based query response generation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Candidate projection enumeration based query response generation apparatuses, methods for candidate projection enumeration based query response generation, and non-transitory computer readable media having stored thereon machine readable instructions to provide candidate projection enumeration based query response generation are disclosed herein. The apparatuses, methods, and non-transitory computer readable media disclosed herein provide for implementation of a tree-based search technique to reduce a search space by strategically generating candidate projections that may be utilized for responding to a query. In this regard, a query and a set of table definitions for responding to the query may be received. The table definitions may include an identification of columns that are stored using tables. The query may indicate some type of operation associated with the columns (e.g., adding the contents of two columns). A benefit model may be utilized to propagate and score a tree-based model. The propagated tree-based model may be pruned to stop expansion thereof. A set of candidate projections may be generated based on the final propagated tree-based model. The candidate projections may be used to respond to the query, for example, by executing the query. Based on the implementation of the candidate projections, a query may be executed faster compared to utilization of projections, in addition to the candidate projections, that are not suitable for responding to the query.

With respect to candidate projection enumeration based query response generation, projections may be described as attribute subsets from one or more tables with tuples sorted by one or more attributes (e.g., where a table column is a table attribute). In a distributed database that includes a plurality of nodes, a projection may represent a storage of certain columns of a table (e.g., how data is sorted and segmented). A table may include one or more projections. A node may represent a physical machine in a data cluster. Projections may be replicated or segmented on cluster nodes.

With respect to projections, it is technically challenging to enumerate appropriate column sets, sort orders, and/or clustered data distributions. In this regard, query performance and a storage footprint may also need to be accounted for with respect to projections that are utilized to respond to a query. One technique of implementation of projections includes application of all possible sort orders and segmentation options extracted from a query workload. This technique may utilize certain columns extracted from an input sample workload for a query. This technique may utilize a relatively substantial search space, and projections may be generated based on predefined rules. In this regard, it is technically challenging to generate projections while utilizing a relatively small search space. Further, a relatively high number of ineffective projections may be generated. It is therefore also technically challenging to reduce a number of projections that are to be tested (e.g., the projections that can potentially respond to a query) and thus utilized (e.g., the projections that are actually used) to respond to a query.

The apparatuses, methods, and non-transitory computer readable media disclosed herein address at least the aforementioned technical challenges by reducing a number of projections that are to be tested, as well as constraining a search space that includes strategically generated candidate projections that may be more beneficial for responding to queries. Thus, the apparatuses, methods, and non-transitory computer readable media disclosed herein provide for saving of storage space, as well as reduction of a search time during candidate projection enumeration based query response generation. For example, the search space may be constrained to strategically generated candidate projections that include a higher potential to benefit queries. In this regard, the candidate projection enumeration based query response generation may utilize a best-first approach that uses a benefit based metric to prune out a projection search space to generate candidate projections. Alternatively or additionally, a full-search approach may be implemented by using another benefit based metric to prune out a projection search space to generate candidate projections. The search process may utilize a benefit model as disclosed herein. Thus, certain benefits obtained by a database designer (e.g., candidate projection generation module as disclosed herein) may be estimated by examining a structure of a query and a definition of a candidate projection, without the need to generate the candidate projection. In this regard, a projection's design such as sort order of segmentation may help speed up a workload query. For example, a query may have a join between table-1 and table-2, and if both projections are sorted by the join key, they may receive a benefit of merge join, and if both projections are segmented in the same way, they may receive a benefit of local join. For example, if a chosen sort order does not match the first two or three columns in an order-by clause of a query, the projection would not be generated for that query's plan, nor will any sorted order with more sort columns appended to it. Thus, by using the benefit model, a search may focus on exploring further (e.g., generating) projections that have a high potential of being used for responding to the query.

According to examples disclosed herein, the query response generation module as disclosed herein may utilize projections to execute a query. For example, the query response generation module may test projections to determine whether they are beneficial for responding to a query. In this regard, for a projection that may represent a physical storage of data, in order to use projections to respond to a query, the query may read the data in files associated with the corresponding projection. Based on different projection characteristics such as sort order or segmentation, the data layout in the data files may be different. Thus, a more relevant projection may provide a faster response to a query.

According to examples disclosed herein, the apparatuses, methods, and non-transitory computer readable media disclosed herein may utilize a tree-based technique (e.g., a tree-based model as disclosed herein) to identify a reduced number of projections, denoted candidate projections. Further, the tree-based model may be used with the benefit model to prune branches thereof, and to thus limit a number of candidate projections that are generated.

In examples described herein, module(s) may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example candidate projection enumeration based query response generation apparatus (hereinafter also referred to as "apparatus 100").

Referring to FIG. 1, the apparatus 100 may include a query analysis module 102 to obtain a query 104.

A candidate column identification module 106 may identify, based on the query 104, a plurality of candidate columns 108 from at least one table 110 to respond to the query 104.

A candidate projection generation module 112 may analyze, using a tree-based model 114, the candidate columns 108 to generate a candidate set of projections 116 to respond to the query 104. Each candidate projection of the candidate set of projections 116 may include a sort order 118 associated with at least one candidate column of the candidate columns 108, a segmentation key value 120 associated with at least one candidate column of the candidate columns 108, and a replication value 122 associated with the candidate projection.

According to examples disclosed herein, the candidate projection generation module 112 may generate, for each candidate projection of the candidate set of projections 116, a state vector 124 that includes sort orders associated with all of the candidate columns 108, segmentation key values associated with all of the candidate columns 108, and the replication value 122 associated with the candidate projection.

According to examples disclosed herein, the candidate projection generation module 112 may determine, for each candidate projection of the candidate set of projections 116, based on an analysis of the state vector 124, a score associated with the state vector 124 by analyzing a join operation, a group-by operation, and/or an order-by operation associated with the query 104 and the candidate projection.

According to examples disclosed herein, the candidate projection generation module 112 may expand, for each candidate column of the candidate columns 108 that includes an associated sort order, a branch of the tree-based model 114 with respect to the sort order associated with the candidate column to add a candidate projection. Further, the candidate projection generation module 112 may determine, for each added candidate projection, based on an analysis of the state vector 124, a score associated with the state vector 124.

According to examples disclosed herein, the candidate projection generation module 112 may determine, for each added candidate projection, whether the score associated with the state vector 124 is less than a score associated with a state vector of a previously added candidate projection. Further, based on a determination that the score associated with the state vector 124 is less than the score associated with the state vector of the previously added candidate projection, the candidate projection generation module 112 may stop expansion of the branch of the tree-based model.

According to examples disclosed herein, the candidate projection generation module 112 may expand, for each candidate column of the candidate columns 108 that includes the associated sort order, the branch of the tree-based model 114 for which the score for the added candidate projection is greater than a score for another added candidate projection of another branch.

According to examples disclosed herein, the candidate projection generation module 112 may expand, for each candidate column of the candidate columns 108 that includes an associated segmentation key value, a branch of the tree-based model 114 with respect to the segmentation key value associated with the candidate column to add a candidate projection. Further, the candidate projection generation module 112 may determine, for each added candidate projection, based on an analysis of the state vector 124, a score associated with the state vector 124.

According to examples disclosed herein, the candidate projection generation module 112 may expand a branch of the tree-based model 114 with respect to the replication value associated with the candidate projection.

A query response generation module 126 may generate, based on the candidate set of projections 116, a response 128 to the query 104.

Operation of the apparatus 100 is described in further detail with reference to FIGS. 1-3.

With reference to FIG. 1, with respect to candidate projection enumeration based query response generation, the apparatus 100 may provide for the reduction of a number of projections that are generated and tested. The apparatus 100 may also provide for the reduction of a search space that includes strategically generated candidate projections with a higher potential to benefit queries.

In order to generate candidate projections, as disclosed herein, the candidate projection generation module 112 may analyze, using the tree-based model 114, the candidate columns 108 to generate the candidate set of projections 116 to respond to the query 104. Each candidate projection of the candidate set of projections 116 may include the sort order 118 associated with at least one candidate column of the candidate columns 108, the segmentation key value 120 associated with at least one candidate column of the candidate columns 108, and the replication value 122 associated with the candidate projection. In this regard, according to one example, the candidate projection generation module 112 may perform an enumeration of sort orders, appending possible segmentation options after performing the enumeration of sort orders. Candidate sort orders may be combined with the segmentation options to generate candidate projections. The process may be specified in the following six steps.

At step one, candidate columns (CCs) for each table may be extracted for a given workload W associated with a query. According to one example, the candidate columns may be used in the candidate projection generation module 112 as sort order seeds, and as extenders of the seed-based sort orders. The candidate columns may also be used as segmentation keys (e.g., segmenters).

At step two, given a representative workload W, all candidate columns used as predicates may be combined with all combinations of join predicates, order-by columns, group-by columns, and run length encoding (RLE)-friendly columns of the table in the workload W to generate a set of candidate sort orders for that table. For an example of a predicate, for the operation select * from t where a>10: a>10 may represent a predicate.

At step three, the resulting candidate sort orders may be pruned by capping the number of candidate sort orders per table. In this regard, according to one example, the candidate projection generation module 112 may keep the top-k sort orders with the smallest (or longer) number of keys (smallest string), where k is a predefined threshold on the number of sort orders per table.

At step four, in order to generate the final set of candidate projections, the remaining sort orders may be combined with all feasible segmentation columns (e.g., table columns appearing in group-by and join predicates in the workload W with enough distinct values or columns with even value distributions). Replication of the table may also be considered.

At step five, the output candidate projections may be generated and an optimizer may optimize the queries in the workload W so that the benefits of each projection are determined. An optimizer may represent a component in a database where based on the input query, data layout and statistics, the best plan to execute the query may be produced. The best projections per tables may be retained, and the remaining projections may be dropped. The optimizer may optimize the queries given the remaining projections. The optimized queries (that have similar benefits before and after the projections were dropped) may be removed by the workload W.

At step six, steps one to five may be repeated until the workload W becomes an empty query set or no more benefits can be achieved.

The aforementioned steps one to six may provide for the implementation of candidate projections by including application of all possible sort orders and segmentation options extracted from a query workload. For example, the technique of steps one to six may utilize certain columns extracted from an input sample workload for a query. The technique of steps one to six may utilize a relatively substantial search space, and projections may be generated based on predefined rules.

The apparatus 100 may instead reduce a number of projections that are to be tested, as well as constrain a search space that includes the strategically generated candidate set of projections 116 that may be more beneficial to queries. In this regard, the apparatus 100 may include the candidate projection generation module 112 to implement a search based on the tree-based model 114 on the possible options of sort orders and segmentations for a given table. At every step, the search may determine which tree node of the tree-based model 114 to expand/explore first. For the tree-based model 114, tree nodes may represent a partial or full definition of a projection for a given table. The state vector 124 associated with a tree node may define the sort orders, segmentation keys, and replication option.

With respect to the state vector 124 associated with a tree node, each tree node may represent a partial or final projection schema of a given table. Each tree node's state vector 124 may include three parts that include the sort columns, segmentation columns, and whether or not a column is replicated.

The state vector 124 of each tree node may be represented by a 2*N+1 vector, where N may represent the number of columns of that table. The value of the i-th column (for the sort order) or the (2 $\text{l}$)-th column (for the segmentation order) may indicate the order of the i-th column in the sort key or segmentation key of that table. The last element may indicate whether or not the table is to be replicated.

The candidate columns 108 of a table (as extracted by the candidate column identification module 106 at step one above) may include values in the state vector 124, and the remaining elements in the state vector 124 may be NULL. The candidate columns intended for sort keys and candidate columns for segmentation keys may be distinguished as they are derived differently. Specifically, for sort orders, candidate columns may be derived from order-by predicates (to allow for efficient order-by; for example, the focus may be on the top two or three keys in an order-by clause to further reduce the search space). Further, for sort orders, candidate columns may be derived from predicate columns (e.g., to allow for efficient search), join predicates (e.g., to allow for merge of sort joins), and group-by predicates (e.g., to allow for group-by pipelines).

With respect to segmentation keys, candidate columns may be derived from join predicates (as they may lead to distributed joins), which may need to have enough distinct values to be used as segmenters. Further, the candidate columns may be derived from group-by predicates (e.g., as they can lead to distributed group-by(s)), and columns with even value distributions (e.g., as they can be used as segmenters when the other two options do not provide segmentation-friendly candidate columns). Each state vector 124 may also include an estimated benefit associated with it (e.g., as disclosed herein with respect to the benefit model).

With respect to the state vector 124, as disclosed herein, the candidate projection generation module 112 may generate, for each candidate projection of the candidate set of projections 116, the state vector 124 that includes sort orders associated with all of the candidate columns 108, segmentation key values associated with all of the candidate columns 108, and the replication value 122 associated with the candidate projection.

For example, FIG. 2 illustrates a state vector 124 to illustrate operation of the apparatus 100 in accordance with an example of the present disclosure.

Referring to FIG. 2, the state vector 124 may include columns A, B, C, D. The state vector 124 may indicate a sort order of <A,B> as 1 and 2, respectively at 200 and 202, a segmentation on <D> at 204, and no replication at 206. The state vector 124 may also indicate that columns C and D at 208 and 210 shall not be considered as sort keys, while A, B, and C, at 212, 214, and 216, respectively, are not to be considered as segmentation keys.

Referring again to FIG. 1, with respect to the benefit model, each tree node may be assigned an expected benefit for the input workload W associated with the query 104. The benefit metric may be determined based on the state vector 124 of that tree node. The benefit metric may also be estimated offline, for example, without generating the projection or optimizing the query (e.g., by producing a plan to make the query run faster). With respect to query optimization, Instead, the benefit metric may rely on query and projection properties to estimate the potential benefit of the projection. The benefit may also be based on the weight of the queries. With respect to weight of queries, a workload may include hundreds of queries, but they may not be equally weighted. Certain more frequently run queries or those queries with a stricter service level agreement specification may be assigned a higher weight. The benefit model may assign credits to projections that allow for distributed join, distributed merge join, distributed analytics, sort merge join, distributed group-by, RLE join, RLE group-by, group-by pipeline, and eliminated sort operation.

With respect to distributed join, inner and outer relations may be segmented on a subset of the join predicates, enabling a local join operation for each tree node. If a projection represented by the state vector 124 in a given tree-based model 114 indicates a segmentation on a subset of the join predicates of the query 104, then creating that projection may potentially allow for a distributed join (e.g., a local join operation for each server in a cluster).

With respect to distributed merge join, inner and outer relations may be sorted on join predicates and segmented on join predicates enabling a local merge join. The inner and outer relations may refer to the two input relations of a join operation in the query 104.

With respect to distributed analytics, for an analytic operation with partition-by columns p and order-by columns l, in its over clause, an input relation segmented by p and sorted by l may enable a local analytic operation.

With respect to sort merge join, one of the input relations may be sorted on join predicates enabling a sort merge join. The input relations may represent input tables of the query 104.

With respect to distributed group-by, input relation may be segmented on a subset of the group-by columns, enabling local group-by operations.

With respect to RLE join, RLE-encoded join predicate may enable the join/group-by in compressed form.

With respect to RLE group-by, RLE-encoded group-by predicate may enable the join/group-by in compressed form.

With respect to group-by pipeline, input relation sorted on group-by columns may enable on-the-fly computation (without utilizing an in-memory hash table). A group-by pipeline may refer to a way of executing a group-by operation (e.g., a grouping of input data based on some column) that allows for final results to be determined without storing intermediate results (e.g., without having to write them into memory).

With respect to eliminated sort operation, an input stream sorted on columns may be utilized by an upstream operator (eliminating the need for sorting). An input stream may refer to a series of input tables (e.g., records of relation).

One technique of implementing the benefit model may include checking a set of predefined rules R that examine query and projection properties and assigning a score value. For example, for a query $q_i$ and a projection $p_j$ defined by the state vector $v_j$, the benefit rules may be defined as follows.

For example, as disclosed herein, the candidate projection generation module 112 may determine, for each candidate projection of the candidate set of projections 116, based on an analysis of the state vector 124, a score associated with the state vector 124 by analyzing a join operation, a group-by operation, and/or an order-by operation associated with the query 104 and the candidate projection. In this regard, with respect to the join operation, a first benefit rule may specify that if a subset of the join predicates of inner AND outer relation in $q_i$ are also segmentation columns of $p_j$, assign a score of $s_1$. The value $s_1$ may be proportional to the number of columns in that subset (e.g., distributed join). With respect to an example that results in a score of $s_1$, if a query has as one of its join attributes the attribute (column) x of table-A and the state of the vector represents a projection of table-A that has x as its segmentation key, then this results in score of $s_1$.

A second benefit rule may specify that if join predicates of inner AND outer relation in $q_i$ are also segmentation columns of $p_j$ AND $p_j$ is sorted by the same join predicates, then assign a score of $s_2$ (e.g., distributed merge join). With respect to an example that results in a score of $s_2$, if a query has as join predicate the attribute (column) x of table-A and y of table-B and the state of the vector represents a projection of table-A that uses x as its segmentation key, and the projection is sorted on the same join predicate, then this results in score of $s_2$.

A third benefit rule may be related to distributed analytics.

A fourth benefit rule may specify that if join predicates of one of the input relations in $q_i$ are also the first column of the sort order of $p_j$, then assign a score of $s_4$ (e.g., sort merge join). With respect to an example that results in a score of $s_4$, if the join predicate of a query is the attribute x1 of table-A and the projection $p_j$ of table-A sorted by its attributes $x_1$, $x_2$, ..., $x_n$, then a score $s_4$ is assigned.

A fifth benefit rule may specify that if a subset of the group-by in $q_i$ are also segmentation columns in $p_j$, then assign a score of $s_5$ (e.g., distributed group-by). With respect to an example that results in a score of $s_5$, if a query $q_i$ has a group-by clause that uses attributes $x_1$, $x_2$, ..., $x_m$ of table-A and the projection $p_j$ of table-A may be segmented on a subset of $(x_1, x_2, ..., x_m)$, then a score $s_5$ is assigned.

A sixth benefit rule may specify that if a join predicate in $q_i$ is also an RLE-encoded in $p_j$, then assign a score of $q_i$ (RLE join). With respect to an example that results in a score of $s_6$, if a query $q_i$ has a join predicate attributes $x_1$, $x_2, \ldots, x_m$ of table-A and the projection $p_j$ of table-A is segmented on a subset of $(x_1, x_2, \ldots, x_m)$, then a score $s_6$ is assigned.

A seventh benefit rule may specify that if a group-by predicate in $q_i$ is also an RLE-encoded in $p_j$, then assign a score of $s_7$ (RLE group by). With respect to an example that results in a score of $s_7$, if a query $q_i$ has a group-by clause that uses attributes $x_1$ of table-A and this attribute is RL-encoded in projection $p_j$, then score $s_7$ is assigned.

An eighth benefit rule may specify that if the group-by columns in $q_i$ are also sort order columns in $p_j$, then assign a score of Ss. The order of the group-by columns should match exactly the order of the projection sort key. Value $s_8$ may be proportional to the number of columns that appear in the same consequent order (e.g., group-by pipeline). With respect to an example that results in a score of $s_8$, if a query $q_i$ has a group-by clause that uses attributes $x_1, x_2, \ldots, x_m$ of table-A and the projection $p_j$ of table-A is sorted on $(x_1, x_2, \ldots, x_m)$, then a score $s_8$ is assigned.

A ninth benefit rule may specify that if a subset of the selection predicates in $q_i$ appear in the first two columns of the sort order of $p_j$, then assign a score of $s_8$ (e.g., possibly eliminating a sort operation). With respect to an example that results in a score of $s_8$, if a query $q_i$ has selection predicates on columns $(c_1, c_2, \ldots, c_n)$ of table-A and the projection $p_j$ of table-A has a sort order on columns $(so_1, so_2, \ldots, so_m)$ and sort keys $sk_1$ and $sk_2$ are included in $(c_1, c_2, \ldots, c_n)$, then a score $s_8$ is assigned.

A tenth benefit rule may specify that if a subset of the order-by predicates in $q_i$ appear in exactly the same order in the sort order of $p_j$, then assign a score of $s_{10}$. The value v should be proportional to the number of columns in the matching subset (e.g., possibly eliminating a sort operation). With respect to an example that results in a score of $s_{10}$, if a query $q_i$ has order by predicates on columns $(c_1, c_2, \ldots, c_n)$ of table-A and the projection $p_j$ of table-A has a sort order on columns $(c_1, c_2, \ldots, c_n)$, then a score $s_{10}$ is assigned.

Next, assuming that the workload W has N queries with weight $w_i$ for each query $q_i$, and a projection $p_j$ defined by a tree node or the tree-based model 114 with state vector $v_1$, the potential benefit of the projection $p_j$ for the query $q_i$, $b(p_j, q_i)$, may be defined as:

$$b(p\_j, q\_i) = \sum_{r \in R} w\_i \times score(r, q\_i, v\_j) \quad \text{Equation (1)}$$

For Equation (1), score(r, $q_i$, $p_j$) may represent the score assigned when rule r is checked for query $q_i$ and projection $p_j$.

With respect to tree-based model expansion policies, each tree node $n_j$ may be expanded using the following policies that specify sort order exploration, segmentation key exploration, and replication.

With respect to sort order exploration, as disclosed herein, the candidate projection generation module 112 may expand, for each candidate column of the candidate columns 108 that includes an associated sort order, a branch of the tree-based model 114 with respect to the sort order associated with the candidate column to add a candidate projection. Further, the candidate projection generation module 112 may determine, for each added candidate projection, based on an analysis of the state vector 124, a score associated with the state vector 124. In this regard, an unexplored candidate column (e.g., $CC_{new}$) may be appended to the tree node's $n_j$ current sort order key, $SO_j$. This sort order key $SO_j$ may define the columns of the projection based on which the projection rows are sorted. The projection may be represented by node $n_1$. The set of lineage queries (e.g., that represent the queries based on which $CC_{new}$ was identified as a candidate column) of the $CC_{new}$ may be collected as QLnew. The lineage of candidate columns may be traced by the candidate projection generation module 112. The $CC_{new}$ may be appended to $SO_j$ if any of the following five conditions are met. A first condition may include a determination of whether $SO_j$ is empty and the $CC_{new}$ is a join predicate to one of the input relation in some queries in W. This may allow for a sort merge join (e.g., benefit with score $s_4$). An example of the first condition may include if the sort order of projection $p_j$ is empty (e.g., not determined yet), and there is at least one query in W that has $CC_{new}$ as a join predicate. A second condition may include a determination of whether $CC_{new}$ is a join predicate for the inner and outer relations of at least one query that has one of the columns of $SO_j$ as join predicates. If later one of these sort columns is used as a segmentation column, this would lead to a distributed sort join (e.g., benefit with score $s_2$). A third condition may include a determination of whether there is at least one query with a group-by statement that matches the new sort of order of $SO_j + CC_{new}$, which may provide for a pipelined group by (e.g., benefit with score $s_8$). A fourth condition may include a determination of whether $SO_j$ is empty (or includes no more than 1 column) AND there is at least one query with predicates on the columns of $SO_j$ AND $CC_{new}$, which may allow for an elimination of a sort operation (e.g., benefit with score $s_9$). Further, a fifth condition may include a determination of whether $SO_j$ AND at least one query with a sort order matches the ordering of $SO_j + CC_{new}$, which may allow for an elimination of a sort operation (e.g., benefit with score $s_{10}$).

With respect to segmentation key exploration, as disclosed herein, the candidate projection generation module 112 may expand, for each candidate column of the candidate columns 108 that includes an associated segmentation key value, a branch of the tree-based model 114 with respect to the segmentation key value associated with the candidate column to add a candidate projection. Further, the candidate projection generation module 112 may determine, for each added candidate projection, based on an analysis of the state vector 124, a score associated with the state vector 124. In this regard, given a tree node $n_j$ with a sort order $SO_j$ and a segmentation key (set of columns) $SEG_j$, with respect to adding segmentation keys on the projection definition, a new unexplored candidate column, $CC_{new}$, may be appended to $SEG_j$ if any of the following four conditions are met. As a first condition, if $SEG_j$ is empty and $CC_{new}$ appears as a join predicate for the inner AND outer relation for at least one query in W, this will allow for distributed join (benefit with score $s_1$). As an example of the first condition, if there are no segmentation keys defined (e.g., $SEG_j$ is empty) and there is at least one query $q_1$ with a join predicate $CC_{new}$ and $CC_{new}$ appears as a column in both input relations of the join, then the condition is met and $CC_{new}$ will be a segmentation candidate column. As a second condition, if $SEG_j$ is non empty and $CC_{new}$ appears as join predicate for the inner AND outer relation in at least one query that also has a subset of the columns in $SEG_j$ that appears as join predicates for the inner AND outer relation, this will allow for distributed join (benefit with score $s_1$). As a third condition, if $SEG_j$ is empty and $CC_{new}$ appears as the first group-by predicate or at least one query in W, this will allow for distributed group by (benefit with score $s_5$). As a fourth condition, if $SEG_j$ is non empty and $SE_j + CC_{new}$ appears as group-by predicate (in exactly the same order as the $SEG_j + CC_{new}$) in at least one query, this will allow for distributed group-by (benefit with score $s_5$).

With respect to replication, as disclosed herein, the candidate projection generation module 112 may expand a branch of the tree-based model 114 with respect to the replication value associated with the candidate projection. In this regard, a table may be replicated.

The candidate projection generation module 112 may apply the above policies associated with sort order exploration, segmentation key exploration, and replication in the order of first adding a sort key, then a segmentation key, and then a replication strategy. For example, a search tree may be defined for a given single table. The root tree node of that search tree may start with a state of "*" (indicating the value of "unknown") for sort order columns, segmentation columns, replication option for all positions of candidate columns, and NULL in all the rest (e.g., no-candidate columns).

The root tree node may be expanded by examining the next candidate column to explore for the sort order. If the sort order of a tree node cannot be extended further, a candidate column (CC) may be explored for segmentation. If the segmentation keys cannot be further extended, replication may be considered.

Once the replication exploration is completed, the next unexplored tree node may be evaluated. Each time a tree node is expanded, its state vector may be updated. Further, an expected benefit may be determined for the tree node according to its state.

With respect to pruning of the tree-based model 114, as disclosed herein, the candidate projection generation module 112 may determine, for each added candidate projection, whether the score associated with the state vector 124 is less than a score associated with a state vector of a previously added candidate projection. Further, based on a determination that the score associated with the state vector 124 is less than the score associated with the state vector of the previously added candidate projection, the candidate projection generation module 112 may stop expansion of the branch of the tree-based model. Thus, expansion of a tree node may be stopped in the following three cases. A first case may include where no descendent tree node is possible (e.g., no more candidate columns (CCs) to consider for sort order and segmentation keys). A second case may include where there is no query that can benefit from a descendent tree node (e.g., for instance there is no query that satisfies the conditions mention above; there is no extra benefit from the new tree node). A third case may include where no descendent tree node has higher benefit (e.g., better than the existing one), in which case if the benefits start decreasing (for instance if the sort order is expected to benefit less queries), then the subtree does not need to be explored further.

With respect to search strategy, as disclosed herein, the candidate projection generation module 112 may expand, for each candidate column of the candidate columns 108 that includes the associated sort order, the branch of the tree-based model 114 for which the score for the added candidate projection is greater than a score for another added candidate projection of another branch. In this regard, various strategies may be used for exploring the projection space (e.g., expanding tree node). The policies may indicate which tree node will be the next one to expand next (e.g., at backtracking). The policies may include a full-search policy, a depth-first search policy, a best first search policy, an exploratory search policy, and a feedback-based search policy.

With respect to the full-search policy, a goal may include exploring all options and estimating their benefit. A set of constraints on the expansion policies as well as pruning policies may prevent this from being an exhaustive enumeration. The expected potential benefit of each tree node in the final tree-based model 114 (e.g., final tree) may be estimated and the top-k projections may be sent to the next step of the candidate projection generation module 112. The k threshold may be specified, for example, based on factors such as balance between speed and accuracy.

With respect to the depth-first search policy, the last tree node that was expanded may be further expanded until it cannot be expanded. Further processing may backtrack to the tree node with the highest expected benefit. A search time threshold or a number of candidate projections may be set to generate as a stop condition. The threshold may be specified, for example, to balance effectiveness and speed of the search for the best projection.

With respect to the best first search policy, the tree node with the highest expected benefit may be expanded. A search time threshold or a number of candidate projections may be set to generate as a stop condition. The threshold may be specified, for example, to balance effectiveness and speed of the search for the best projection.

With respect to the exploratory search policy, tree nodes that have a similar benefit (e.g., due to having similar sort orders or segmentation keys) may be pruned out. Multiple branches may also be explored in parallel. The branches may be chosen based on expected benefit, as well as also based on exploratory properties (e.g., for example explore branches with significant differences in sort orders).

With respect to the feedback-based search policy, at the early stages of a search, the actual benefits of certain projections and sort orders defined by tree nodes that are early up in the tree-based model 114 (e.g., tree) may be analyzed. This analysis may be used to provide feedback on which branches are to be explored further based on actual benefit (e.g., not estimated).

A search may be performed on a single or multiple tables. With respect to multiple tables, constraints may include a number of total projections. In this regard, FIG. 3 illustrates a tree-based model 114 to illustrate operation of the apparatus 100 in accordance with an example of the present disclosure.

Figure 3:
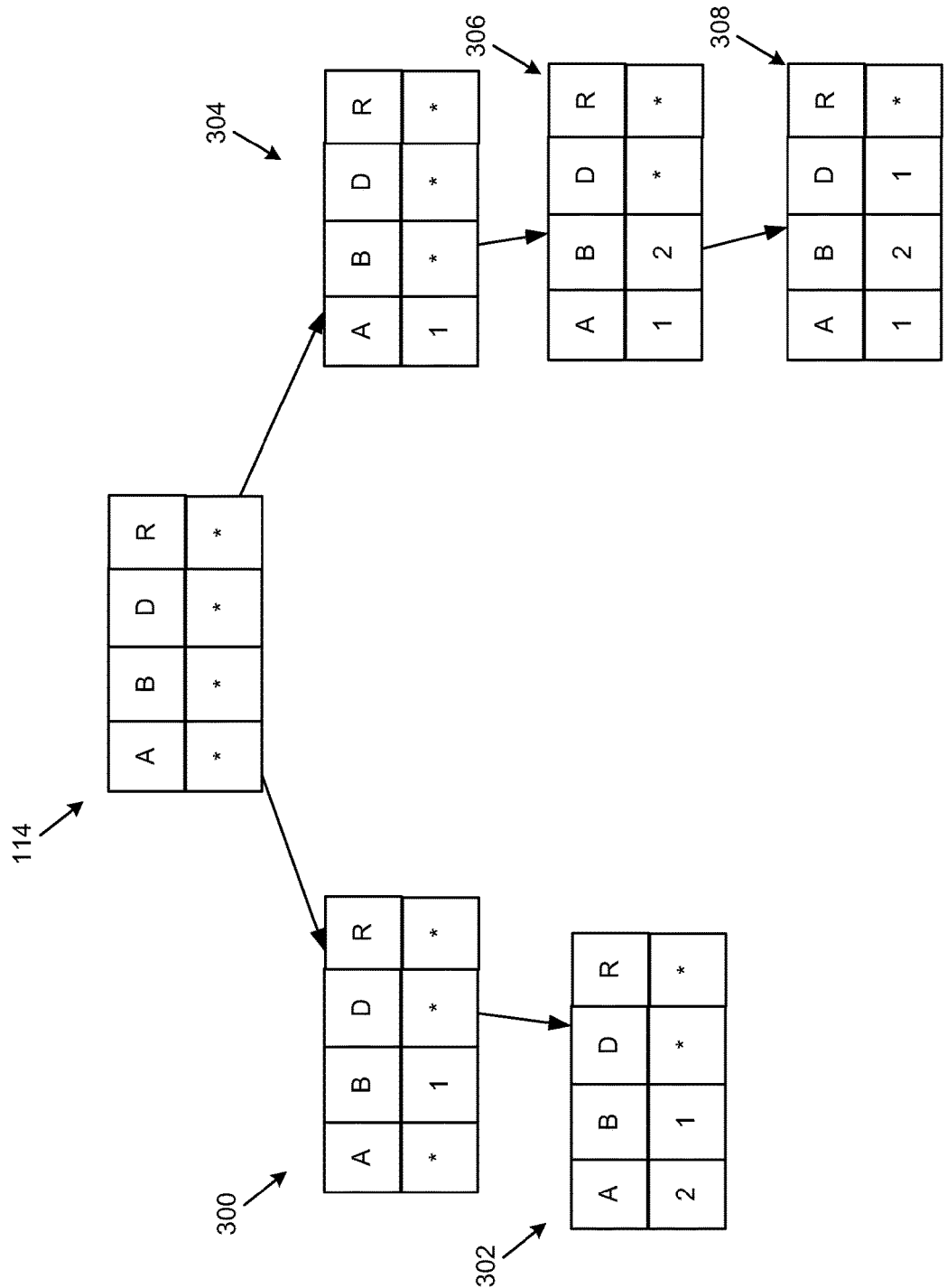
FIG. 3 illustrates a tree-based model to illustrate operation of the candidate projection enumeration based query response generation apparatus of FIG. 1 in accordance with an example of the present disclosure.

Referring to FIG. 3, the tree-based model 114 may include five tree nodes at 300, 302, 304, 306, and 308. The leftmost branch including tree nodes 300 and 302 may be a sort-by-B branch, and the rightmost branch including tree nodes 304, 306, and 308 may be a sort-by-A branch. The rightmost branch including tree nodes 304, 306, and 308 may be explored for sort orders and then for a segmentation key. The bottom tree node 308 may indicate a projection with a sort order of <A,B> and a segmentation based on the <D> column. Attributes that are not eligible for sort keys or segmentation keys may be omitted form the tree node's state. Once the sort order exploration cannot be extended further (in this case there are no more candidate columns to consider for the sort order), the segmentation keys may be analyzed.

With respect to ranking candidate columns (e.g., seeds/ extenders/segmenters), in order to determine which candidate column to consider adding next to the current sort order or segmentation key of a tree node, the candidate columns may be ranked by leveraging the aforementioned benefit model.

Candidate column rankings for sort order and segmentation keys may be distinguished. In each case, the priority of each candidate column may be based on the number of queries that are using them to ensure that candidate columns that are valuable to most queries are analyzed first. For example, candidate column for sort orders (or segmentation) may be ranked based on the number and weight of the queries having them as a candidate column (or potential segmentation key). For a given candidate column, a weighted sum of the number of queries for which the candidate column is identified by the query analysis module 102 may be applied as a sort order key (or possible segmentation column). For the example of FIG. 3, assuming that all queries have the same weight, if there are more queries that have A as a predicate, or in order-by/group-by clause or as a join predicate, than B, then adding A in the sort order may be explored first.

FIGS. 4A-4E illustrate an example of operation of the apparatus 100 in accordance with an example of the present disclosure.

Figure 4C:
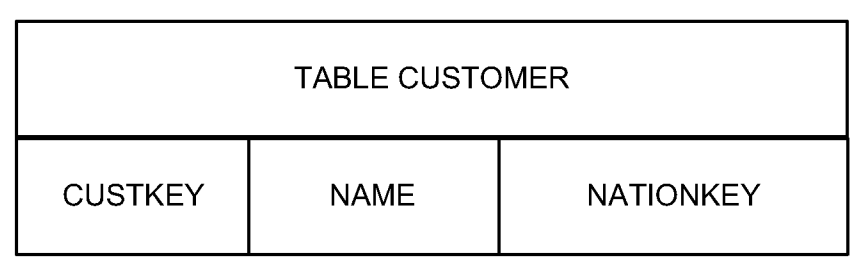
Figure 4D:
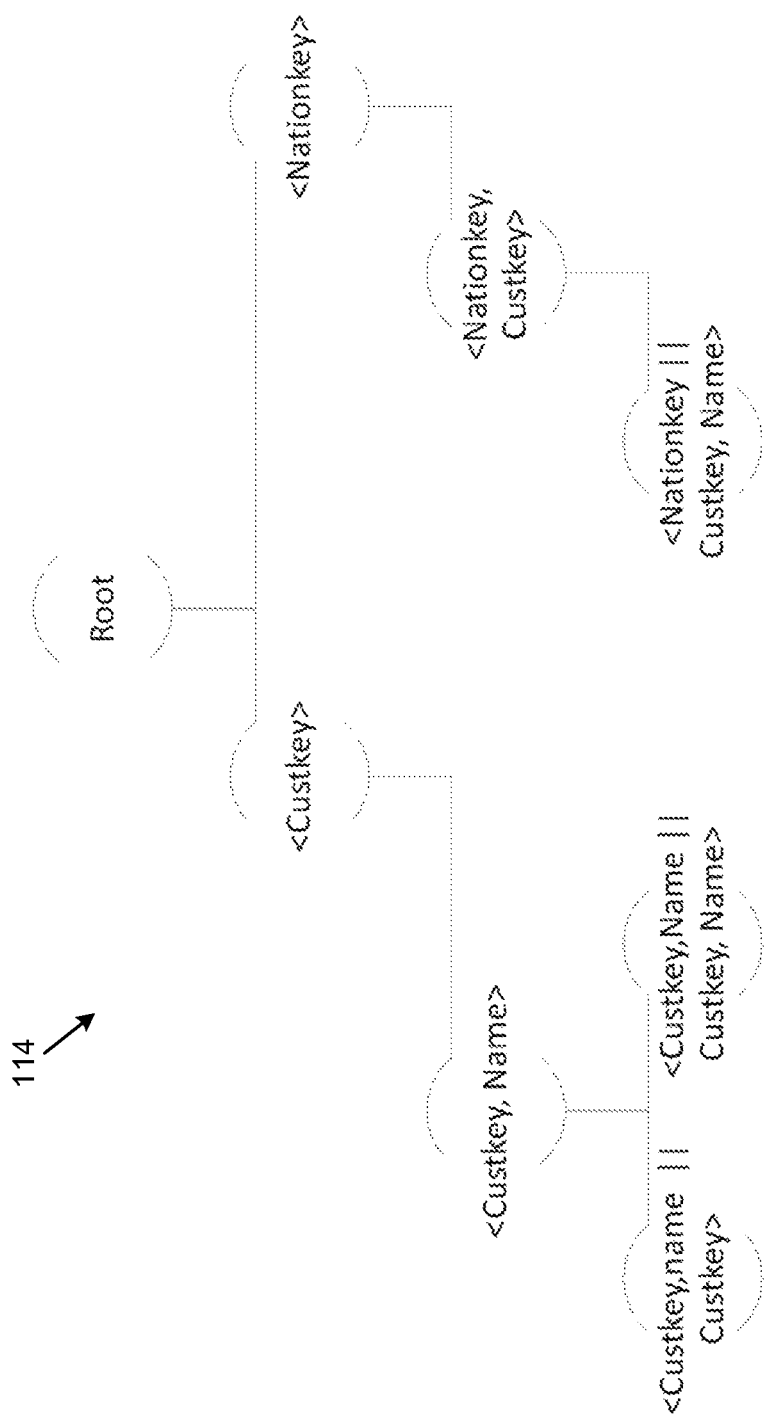

Referring to FIG. 4A, an example of queries includes a Query-1 and a Query-2. FIG. 4B shows two associated tables, namely "TABLE CUSTOMER" and "TABLE ORDER", that include columns as shown. FIG. 4C shows extraction of the candidate columns "custkey", "name", and "nationkey". FIG. 4D shows an associated tree-based model 114. Further, FIG. 4E shows a projection from a candidate set of projections 116.

Figure 5:
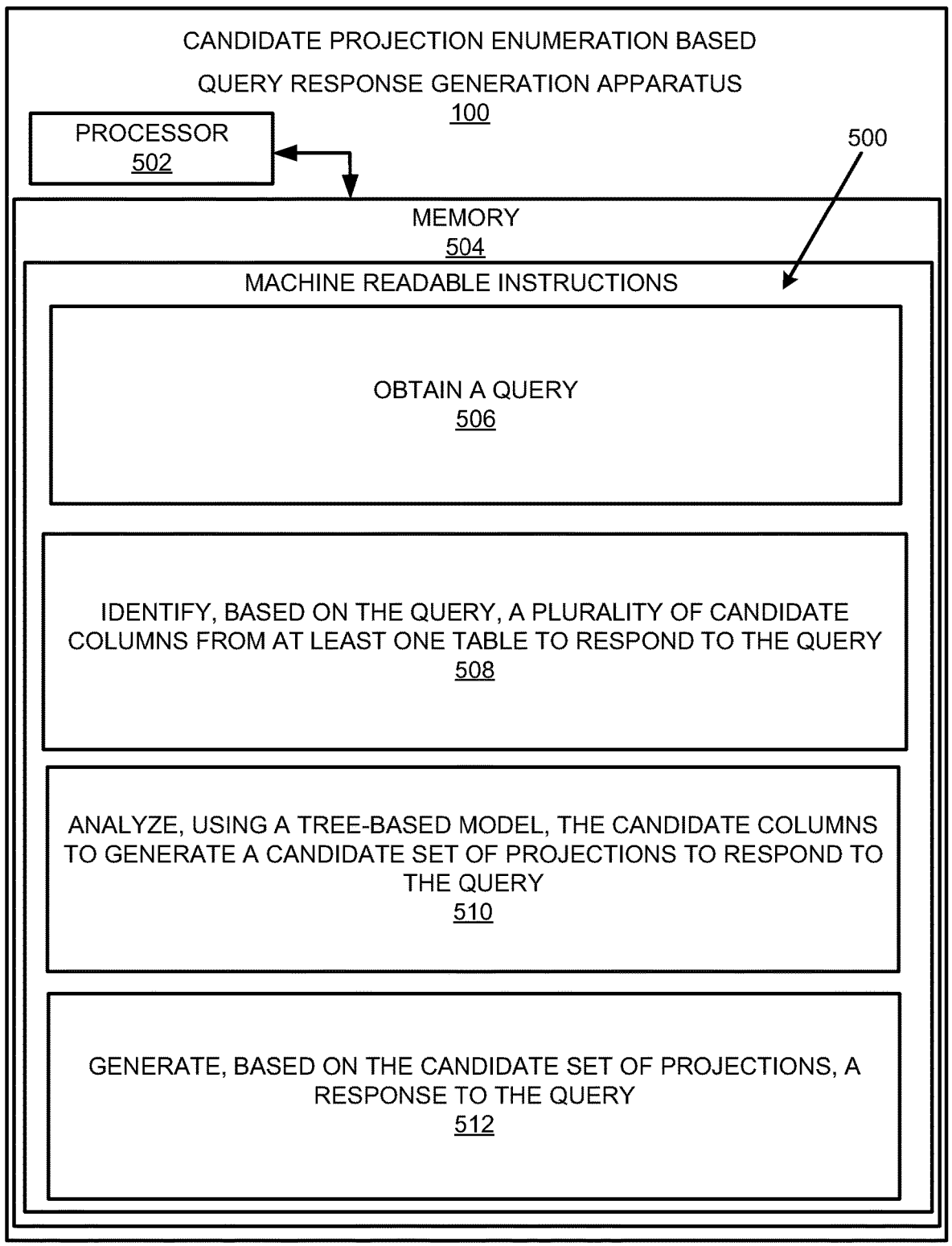
FIG. 5 illustrates an example block diagram for candidate projection enumeration based query response generation in accordance with an example of the present disclosure.
Figure 7:
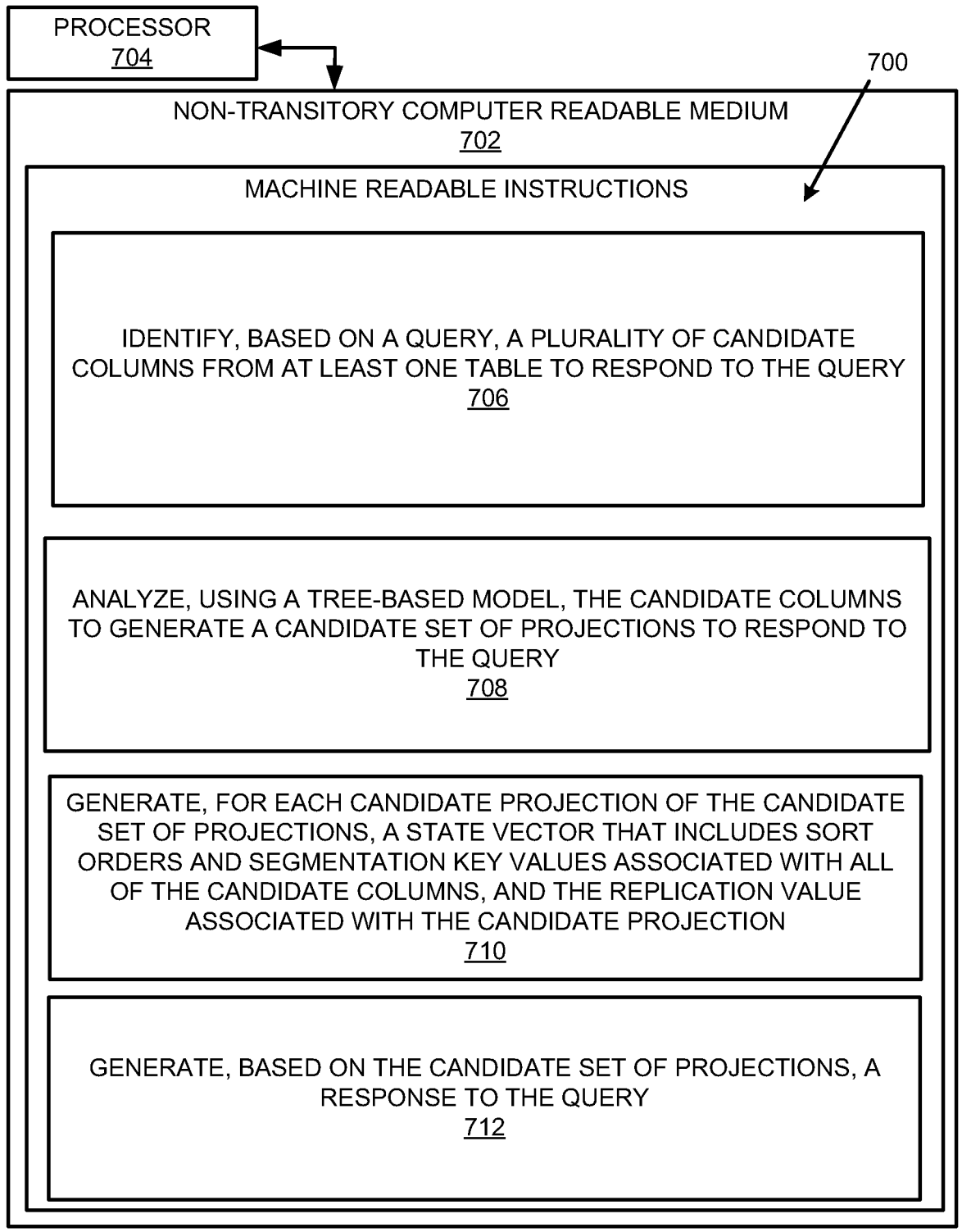
FIG. 7 illustrates a further example block diagram for candidate projection enumeration based query response generation in accordance with another example of the present disclosure.

FIGS. 5-7 respectively illustrate an example block diagram 500, a flowchart of an example method 600, and a further example block diagram 700 for candidate projection enumeration based query response generation, according to examples. The block diagram 500, the method 600, and the block diagram 700 may be implemented on the apparatus 100 described above with reference to FIG. 1 by way of example and not of limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 storing machine readable instructions that when executed by the processor cause the processor to perform the instructions of the block diagram 500. The memory 504 may represent a non-transitory computer readable medium. FIG. 6 may represent an example method for candidate projection enumeration based query response generation, and the steps of the method. FIG. 7 may represent a non-transitory computer readable medium 702 having stored thereon machine readable instructions to provide candidate projection enumeration based query response generation according to an example. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to obtain a query 104.

The processor 502 may fetch, decode, and execute the instructions 508 to identify, based on the query 104, a plurality of candidate columns 108 from at least one table 110 to respond to the query 104.

The processor 502 may fetch, decode, and execute the instructions 510 to analyze, using a tree-based model 114, the candidate columns 108 to generate a candidate set of projections 116 to respond to the query 104.

The processor 502 may fetch, decode, and execute the instructions 512 to generate, based on the candidate set of projections 116, a response 128 to the query 104.

Referring to FIGS. 1-4E and 6, and particularly FIG. 6, for the method 600, at block 602, the method may include identifying, by a processor, based on a query 104, a plurality of candidate columns 108 from at least one table 110 to respond to the query 104.

At block 604, the method may include analyzing, by the processor, using a tree-based model 114, the candidate columns 108 to generate a candidate set of projections 116 to respond to the query 104.

At block 606, the method may include generating, by the processor, for each candidate projection of the candidate set of projections 116, a state vector 124 that is analyzed to control expansion of the tree-based model 114.

At block 608, the method may include generating, by the processor, based on the candidate set of projections 116, a response 128 to the query 104.

Referring to FIGS. 1-4E and 7, and particularly FIG. 7, for the block diagram 700, the non-transitory computer readable medium 702 may include instructions 706 to identify, based on a query 104, a plurality of candidate columns 108 from at least one table 110 to respond to the query 104.

The processor 704 may fetch, decode, and execute the instructions 708 to analyze, using a tree-based model 114, the candidate columns 108 to generate a candidate set of projections 116 to respond to the query 104.

The processor 704 may fetch, decode, and execute the instructions 710 to generate, for each candidate projection of the candidate set of projections 116, a state vector 124 that includes sort orders and segmentation key values associated with all of the candidate columns 108, and the replication value associated with the candidate projection.

The processor 704 may fetch, decode, and execute the instructions 712 to generate, based on the candidate set of projections 116, a response 128 to the query 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   at least one processor; and
   a non-transitory computer readable medium storing machine readable instructions that when executed by the at least one processor cause the at least one processor to:
   obtain a query;
   identify, based on the query, a plurality of candidate columns from at least one table to respond to the query;
   analyze, using a tree-based model, the plurality of candidate columns to generate a candidate set of projections to respond to the query, wherein each candidate projection of the candidate set of projections includes a sort order associated with at least one candidate column of the plurality of candidate columns, a segmentation key value associated with at least one candidate column of the plurality of candidate columns, and a replication value associated with the candidate projection;

generate, for each candidate projection of the candidate set of projections, a state vector that is analyzed to control expansion of the tree-based model; and generate, based on the candidate set of projections, a response to the query.

2. The apparatus according to claim 1, wherein the state vector includes:

sort orders associated with all of the candidate columns;

segmentation key values associated with all of the candidate columns; and the replication value associated with the candidate projection.

3. The apparatus according to claim 2, wherein the instructions to analyze, using the tree-based model, the plurality of candidate columns to generate the candidate set of projections to respond to the query further cause the processor to:

determine, for each candidate projection of the candidate set of projections, based on an analysis of the state vector, a score associated with the state vector by analyzing a join operation associated with the query and the candidate projection.

4. The apparatus according to claim 2, wherein the instructions to analyze, using the tree-based model, the plurality of candidate columns to generate the candidate set of projections to respond to the query further cause the processor to:

determine, for each candidate projection of the candidate set of projections, based on an analysis of the state vector, a score associated with the state vector by analyzing a group-by operation associated with the query and the candidate projection.

5. The apparatus according to claim 2, wherein the instructions to analyze, using the tree-based model, the plurality of candidate columns to generate the candidate set of projections to respond to the query further cause the processor to:

determine, for each candidate projection of the candidate set of projections, based on an analysis of the state vector, a score associated with the state vector by analyzing an order-by operation associated with the query and the candidate projection.

6. The apparatus according to claim 2, wherein the instructions to analyze, using the tree-based model, the plurality of candidate columns to generate the candidate set of projections to respond to the query further cause the processor to:

expand, for each candidate column of the plurality of candidate columns that includes an associated sort order, a branch of the tree-based model with respect to the sort order associated with the candidate column to add an added candidate projection; and determine, for each added candidate projection, based on an analysis of the state vector, a score associated with the state vector.

7. The apparatus according to claim 6, wherein the instructions further cause the processor to:

determine, for each added candidate projection, whether the score associated with the state vector is less than a score associated with a state vector of a previously added candidate projection; and based on a determination that the score associated with the state vector is less than the score associated with the state vector of the previously added candidate projection, stop expansion of the branch of the tree-based model.

8. The apparatus according to claim 6, wherein the instructions further cause the processor to:

expand, for each candidate column of the plurality of candidate columns that includes the associated sort order, the branch of the tree-based model for which the score for the added candidate projection is greater than a score for another added candidate projection of another branch.

9. The apparatus according to claim 2, wherein the instructions to analyze, using the tree-based model, the plurality of candidate columns to generate the candidate set of projections to respond to the query further cause the processor to:

expand, for each candidate column of the plurality of candidate columns that includes an associated segmentation key value, a branch of the tree-based model with respect to the segmentation key value associated with the candidate column to add a candidate projection; and determine, for each added candidate projection, based on an analysis of the state vector, a score associated with the state vector.

10. The apparatus according to claim 9, wherein the instructions further cause the processor to:

determine, for each added candidate projection, whether the score associated with the state vector is less than a score associated with a state vector of a previously added candidate projection; and based on a determination that the score associated with the state vector is less than the score associated with the state vector of the previously added candidate projection, stop expansion of the branch of the tree-based model.

11. The apparatus according to claim 1, wherein the instructions to analyze, using the tree-based model, the candidate columns to generate the candidate set of projections to respond to the query further cause the processor to:

expand a branch of the tree-based model with respect to the replication value associated with the candidate projection.

12. A computer implemented method comprising:

identifying, by a processor, based on a query, a plurality of candidate columns from at least one table to respond to the query;

analyzing, by the processor, using a tree-based model, the plurality of candidate columns to generate a candidate set of projections to respond to the query, wherein each candidate projection of the candidate set of projections includes a sort order associated with at least one candidate column of the plurality of candidate columns, a segmentation key value associated with at least one candidate column of the plurality of candidate columns, and a replication value associated with the candidate projection;

generating, by the processor, for each candidate projection of the candidate set of projections, a state vector that is analyzed to control expansion of the tree-based model; and generating, by the processor, based on the candidate set of projections, a response to the query.

13. The method according to claim 12, wherein generating, by the processor, for each candidate projection of the candidate set of projections, the state vector that is analyzed to control expansion of the tree-based model further comprises:

generating, by the processor, for each candidate projection of the candidate set of projections, the state vector that includes:
- sort orders associated with all of the plurality of candidate columns;
- segmentation key values associated with all of the plurality of candidate columns; and
- the replication value associated with the candidate projection.

14. The method according to claim 12, wherein analyzing, by the processor, using the tree-based model, the plurality of candidate columns to generate the candidate set of projections to respond to the query further comprises:
determining, by the processor, for each candidate projection of the candidate set of projections, based on an analysis of the state vector, a score associated with the state vector by analyzing at least one of a join operation, a group-by operation, or an order-by operation associated with the query and the candidate projection.

15. A non-transitory computer readable medium having stored thereon machine readable instructions, the machine readable instructions, when executed, cause a processor to:
identify, based on a query, a plurality of candidate columns from at least one table to respond to the query;
analyze, using a tree-based model, the plurality of candidate columns to generate a candidate set of projections to respond to the query, wherein each candidate projection of the candidate set of projections includes a sort order and a segmentation key value associated with at least one candidate column of the plurality of candidate columns, and a replication value associated with the candidate projection;
generate, for each candidate projection of the candidate set of projections, a state vector that includes:
- sort orders and segmentation key values associated with all of the plurality of candidate columns, and
- the replication value associated with the candidate projection; and generate, based on the candidate set of projections, a response to the query.

16. The non-transitory computer readable medium according to claim 15, wherein the machine readable instructions to analyze, using the tree-based model, the plurality of candidate columns to generate the candidate set of projections to respond to the query, when executed, further cause the processor to:
expand, for each candidate column of the plurality of candidate columns that includes an associated sort order, a branch of the tree-based model with respect to the sort order associated with the candidate column to add a candidate projection; and
determine, for each added candidate projection, based on an analysis of the state vector, a score associated with the state vector.

17. The non-transitory computer readable medium according to claim 16, wherein the machine readable instructions, when executed, further cause the processor to:
determine, for each added candidate projection, whether the score associated with the state vector is less than a score associated with a state vector of a previously added candidate projection; and
based on a determination that the score associated with the state vector is less than the score associated with the state vector of the previously added candidate projection, stop expansion of the branch of the tree-based model.

18. The non-transitory computer readable medium according to claim 16, wherein the machine readable instructions, when executed, further cause the processor to:
expand, for each candidate column of the plurality of candidate columns that includes the associated sort order, the branch of the tree-based model for which the score for the added candidate projection is greater than a score for another added candidate projection of another branch.

19. The non-transitory computer readable medium according to claim 15, wherein the machine readable instructions to analyze, using the tree-based model, the plurality of candidate columns to generate the candidate set of projections to respond to the query, when executed, further cause the processor to:
expand, for each candidate column of the plurality of candidate columns that includes an associated segmentation key value, a branch of the tree-based model with respect to the segmentation key value associated with the candidate column to add a candidate projection; and
determine, for each added candidate projection, based on an analysis of the state vector, a score associated with the state vector.

20. The non-transitory computer readable medium according to claim 19, wherein the machine readable instructions, when executed, further cause the processor to:
determine, for each added candidate projection, whether the score associated with the state vector is less than a score associated with a state vector of a previously added candidate projection; and
based on a determination that the score associated with the state vector is less than the score associated with the state vector of the previously added candidate projection, stop expansion of the branch of the tree-based model.

* * * * *